United States Patent
Son

(10) Patent No.: US 7,599,033 B2
(45) Date of Patent: Oct. 6, 2009

(54) IN-PLANE SWITCHING MODE LIQUID CRYSTAL DISPLAY DEVICE

(75) Inventor: Hyeon Ho Son, Gyeonggi-do (KR)

(73) Assignee: LG Display Co., Ltd., Seoul (KR)

( * ) Notice: Subject to any disclaimer, the term of this patent is extended or adjusted under 35 U.S.C. 154(b) by 508 days.

(21) Appl. No.: 11/400,388

(22) Filed: Apr. 10, 2006

(65) Prior Publication Data

US 2006/0227276 A1    Oct. 12, 2006

(30) Foreign Application Priority Data

Apr. 11, 2005  (KR) .................. 10-2005-0029936

(51) Int. Cl.
*G02F 1/1343* (2006.01)
(52) U.S. Cl. ......................... 349/141; 349/38
(58) Field of Classification Search ............... 349/141, 349/38
See application file for complete search history.

(56) References Cited

U.S. PATENT DOCUMENTS

| | | | |
|---|---|---|---|
| 6,744,482 B2 * | 6/2004 | Matsumoto et al. | 349/141 |
| 2004/0041970 A1 * | 3/2004 | Lee et al. | 349/141 |

* cited by examiner

*Primary Examiner*—David Nelms
*Assistant Examiner*—David Y Chung
(74) *Attorney, Agent, or Firm*—Morgan, Lewis & Bockius LLP

(57) ABSTRACT

An IPS mode LCD device includes first and second substrates facing each other, gate and data lines on the first substrate and crossing each other to define a plurality of unit pixel regions, first and second electrode patterns formed in an island shape at a pre-determined interval therebetween and overlapped with sides of the data line, a plurality of common electrodes formed in the unit pixel regions, each of the common electrodes having outermost common electrodes partially overlapped with the first and second electrode patterns, a pixel electrode alternately provided with the common electrodes within the pixel unit region, and a liquid crystal layer formed between the first and second substrates.

22 Claims, 11 Drawing Sheets

IN-PLANE SWITCHING MODE LIQUID CRYSTAL DISPLAY DEVICE

The present application claims the benefit of the Korean Patent Application No. P2005-29936, filed on Apr. 11, 2005 in Korea, which is hereby incorporated by reference.

BACKGROUND OF THE INVENTION

1. Field of the Invention

The present invention relates to a method for manufacturing a liquid crystal display (LCD) device, and more particularly, to an In-Plane Switching (IPS) mode LCD device having improved transmittance and viewing angle.

2. Discussion of the Related Art

Demands for various display devices have increased with development of an information based society. Accordingly, many efforts have been made to research and develop various flat display devices, such as liquid crystal display (LCD) devices, plasma display panel (PDP) devices, electroluminescent display (ELD) devices, and vacuum fluorescent display (VFD) devices. Some versions of flat display devices have already been implemented into displays for various equipment.

Among the various flat display devices, liquid crystal display (LCD) devices have been most commonly used due to advantageous characteristics, such as thin profile, light weight, and low power consumption, whereby the LCD devices provide a substitute for Cathode Ray Tube (CRT) devices. In addition to mobile type LCD devices, such as a notebook computer display, LCD devices have also been developed for computer monitors and televisions for receiving and displaying broadcasting signals.

Despite various technical developments in the LCD technology, research in enhancing the picture quality of the LCD device has been, in some respects, lacking as compared to other features of the LCD device. The key to developing LCD devices for wide use depends on whether LCD devices can implement a high quality picture, including high resolution and high luminance with a large-sized screen, while still maintaining a light weight, thin profile, and low power consumption.

FIG. 1 is an exploded perspective view an LCD device according to the related art. As shown in FIG. 1, the LCD device is comprised of a first substrate 1 and a second substrate 2 facing each other, and a liquid crystal layer 3 formed between the first and second substrates 1 and 2 by injection of liquid crystal. The first substrate (i.e., TFT array substrate) 1 includes a plurality of gate lines 4 arranged along a first direction at fixed intervals, a plurality of data lines 5 arranged along a second direction perpendicular to the first direction at fixed intervals, a plurality of pixel electrodes 6 arranged in a matrix-type configuration within pixel regions P defined by crossing of the gate and data lines 4 and 5, and a plurality of thin film transistors T operating via signals supplied to the gate lines 4 for transmitting signals from the data lines 5 to the pixel electrodes. The second substrate (color filter array substrate) 2 includes a black matrix layer 7 that prevents light from portions of the first substrate 1 except at the pixel regions P, an R/G/B color filter layer 8 for displaying various colors, and a common electrode 9 for producing the image.

In the above LCD device, liquid crystal molecules of the liquid crystal layer 3 formed between the first and second substrates 1 and 2 are aligned by an electric field induced between the pixel electrode 6 and the common electrode 9. Thus, transmittance of light passing through the liquid crystal layer 3 is controlled by the alignment of liquid crystal layer 3 to display the images. This is commonly referred to as a Twisted Nematic (TN) mode LCD device, which has a problem of a narrow viewing angle. To overcome this problem of the TN mode LCD device, an In-Plane Switching (IPS) mode LCD device has been developed. In an IPS mode LCD device, the pixel electrode and the common electrode are formed in parallel on the pixel region of the first substrate whereby a transverse electric field parallel to the two substrates is generated so as to align the liquid crystal layer.

FIG. 2 is a plan view of an IPS mode LCD device according to the related art, and FIG. 3 is a cross sectional view of an alignment of liquid crystal material along I-I' of FIG. 2 according to the related art. As shown in FIGS. 2 and 3, the IPS mode LCD device includes first and second substrates 30 and 40. Specifically, the first substrate 30 includes a plurality of gate lines 31 arranged along a first direction at fixed intervals, a plurality of data lines 32 arranged along a second direction perpendicular to the first direction at fixed intervals, a plurality of thin film transistors TFTs formed adjacent crossings of the gate and data lines 31 and 32, and a pixel electrode 33 and a common electrode 35a alternately formed in each pixel region defined by crossing of the gate and data lines 31 and 32.

The thin film transistor TFT includes a gate electrode 31a protruding from the gate line 31, a source electrode 32a protruding from the data line 32, and a drain electrode 32b formed at a predetermined interval from the source electrode 32a. In addition, a semiconductor layer 34 is overlapped with the source and drain electrodes 32a and 32b and covers the gate electrode 31a. Then, a gate insulating layer 36 is formed on an entire surface of the first substrate 30 including the gate line 31. Then, a passivation layer 37 is formed on the gate insulating layer 36, and a passivation hole is defined to expose a predetermined portion of the drain electrode 32b. Through the passivation hole, the pixel electrode 33 is connected with the drain electrode 32b. The gate insulating layer 36 and the passivation layer 37 are formed of an inorganic insulating material at a thickness of 2000 Å (Angstroms) to 4000 Å (Angstroms).

In FIG. 2, the common electrodes 35a and 35b diverge from a common line 35 formed in parallel to the gate line 31 and the common line 35 is overlapped with the pixel electrode 33. The outermost common electrodes 35a formed adjacent to the data line 32 are relatively wider than the common electrode 35b positioned in the center of the pixel region, so as to minimize a space between the adjacent data line 32 and the outermost common electrode 35a. In the case of liquid crystal 50 positioned in the space between the adjacent data line 32 and the outermost common electrode 35a, it is difficult to align the liquid crystal according to a signal voltage applied to the data line 32. In this respect, it is necessary to minimize the space between the adjacent data line 32 and the outermost common electrode 35a.

In FIG. 2, the second substrate 40 is positioned opposite to the first substrate 30. The second substrate 40 includes a black matrix layer 41 to shield a non-pixel area (i.e., gate and data lines 31 and 32) and the thin film transistor TFT from light, an RGB color filter layer 42 for providing R, G, and B colors corresponding to the respective pixel regions, and an overcoat layer 43 formed on an entire surface including the RGB color filter layer 42.

As shown in FIG. 3, corresponding voltage signals are applied to the common electrodes 35a and 35b and the pixel electrode 33 so as to drive the liquid crystal 50, thereby forming a transverse electric field between the common electrodes 35a and 35b and the pixel electrode 33. Accordingly, a cross talk is generated in the space between the outermost common electrode 35a and the adjacent data line 32, whereby the liquid crystal 50 is aligned slantwise, thereby causing a light leakage in a corresponding viewing angle area.

To prevent the light leakage caused by the crosstalk in the space between the outermost common electrode 35a and the adjacent data line 32, a width of the black matrix layer 41 may be increased. However, increasing the width of the black matrix layer 41 will increase aperture ratio loss.

FIG. 4 is a cross sectional view of alignment of liquid crystal in another IPS mode LCD device according to the related art. As shown in FIG. 4, the data line 32 may be partially overlapped with the outermost common electrode 35a to eliminate space between the data line 32 and the outermost common electrode 35a to prevent the light leakage caused by the crosstalk in the viewing angle area. In FIG. 4, an outermost common electrode 35a is partially overlapped with a data line 32. In this case, it is possible to solve the problem of light leakage. However, a parasitic capacitance of $$C = \varepsilon L \frac{x}{d1}$$

is generated in an overlapped area between the data line 32 and the outermost common electrode 35a. Accordingly, it requires a long time to charge the liquid crystal 50 with a pixel voltage, whereby luminance deteriorates and residual images are generated.

The IPS mode LCD device according to the related art has the following disadvantages. If the data line is formed at a predetermined interval from the outermost common electrode, crosstalk is generated in the space between the outermost common electrode and the data line due to the signal voltage applied to the data line, thereby causing light leakage.

If the black matrix layer extends toward the data line so as to prevent the light leakage in the viewing angle area, the aperture ratio deteriorates, thereby lowering its efficiency.

If the data line is partially overlapped with the outermost common electrode so as to prevent the light leakage, the overlapped area has large parasitic capacitance. Accordingly, it requires a long time to charge the liquid crystal with the pixel voltage, whereby luminance deteriorates and residual images are generated. As a result, it is difficult to apply the related art method to a large-sized panel.

SUMMARY OF THE INVENTION

Accordingly, the present invention is directed to an IPS mode LCD device which substantially eliminates one or more problems due to aforementioned limitations and disadvantages in the related art.

An object of the present invention is to provide an In-Plane Switching (IPS) mode LCD device having improved transmittance.

Another object of the present invention is to provide an In-Plane Switching (IPS) mode LCD device that prevents viewing angle crosstalk.

Additional features and advantages of the invention will be set forth in part in the description which follows, in part will be apparent from the description, or will be learned by practice of the invention. The objectives and other advantages of the invention will be realized and attained by the structure particularly pointed out in the written description and claims hereof as well as the appended drawings.

To achieve these and other advantages and in accordance with the purpose of the present invention, as embodied and broadly described, an IPS mode LCD device includes first and second substrates facing each other, gate and data lines on the first substrate and crossing each other to define a plurality of unit pixel regions, first and second electrode patterns formed in an island shape at a predetermined interval therebetween and overlapped with sides of the data line, a plurality of common electrodes formed in the unit pixel regions, each of the common electrodes having outermost common electrodes partially overlapped with the first and second electrode patterns, a pixel electrode alternately provided with the common electrodes within the pixel unit region, and a liquid crystal layer formed between the first and second substrates.

In another aspect of the present invention, an IPS (In-Plane Switching) mode LCD device includes first and second substrates facing each other, gate and data lines on the first substrate and crossing each other to define a plurality of unit pixel regions, a thin film transistor (TFT) formed adjacent to the crossing of the gate and data lines, the TFT includes a gate electrode protruding from the gate line, a source electrode protruding from the data line, and a drain electrode formed at a predetermined interval from the source electrode, first and second electrode patterns formed in an island shape at a predetermined interval therebetween and overlapped with sides of the data line, a common line formed extending across the pixel region parallel to the gate line, a plurality of common electrodes electrically connected with the common line in the unit pixel region, each of the common electrodes having outermost common electrodes partially overlapped with the first and second electrode patterns, a pixel electrode alternately provided with the common electrodes within the unit pixel region and electrically connected with the drain electrode of the pixel region, a gate insulating layer formed between the data line, the gate line, the common line, first electrode pattern and the second electrode pattern, a passivation layer formed between the data line, the common electrode and the pixel electrode, and a liquid crystal layer formed between the first and second substrates.

In another aspect, an IPS (In-Plane Switching) mode LCD device includes first and second substrates facing each other, gate and data lines on the first substrate and crossing each other to define a plurality of unit pixel regions, a thin film transistor (TFT) formed adjacent to the crossing of the gate and data lines, the TFT including a gate electrode protruding from the gate line, a source electrode protruding from the data line, and a drain electrode formed at a predetermined interval from the source electrode, first and second electrode patterns formed in an island shape at a predetermined interval therebetween and overlapped with sides of the data line, a common line formed extending across the pixel region parallel to the gate line, a plurality of common electrodes electrically connected with the common line in the pixel region, each of the common electrodes having outermost common electrodes partially overlapped with the first and second electrode patterns, a pixel electrode alternately provided with the common electrodes in the pixel region and electrically connected with the drain electrode of the pixel region, a gate insulating layer formed between the data line and the gate line, the common line and the common electrode, a passivation layer formed between the data line and the first electrode pattern, the second electrode pattern, and the pixel electrode, and a liquid crystal layer formed between the first and second substrates.

It is to be understood that both the foregoing general description and the following detailed description are exemplary and explanatory and are intended to provide further explanation of the invention as claimed.

BRIEF DESCRIPTION OF THE DRAWINGS

The accompanying drawings, which are included to provide a further understanding of the invention and are incorporated in and constitute a part of this application, illustrate embodiments of the invention and together with the description serve to explain the principle of the invention. In the drawings.

DETAILED DESCRIPTION OF THE PREFERRED EMBODIMENTS

Reference will now be made in detail to the preferred exemplary embodiments of the present invention, examples of which are illustrated in the accompanying drawings.

Figure 1:
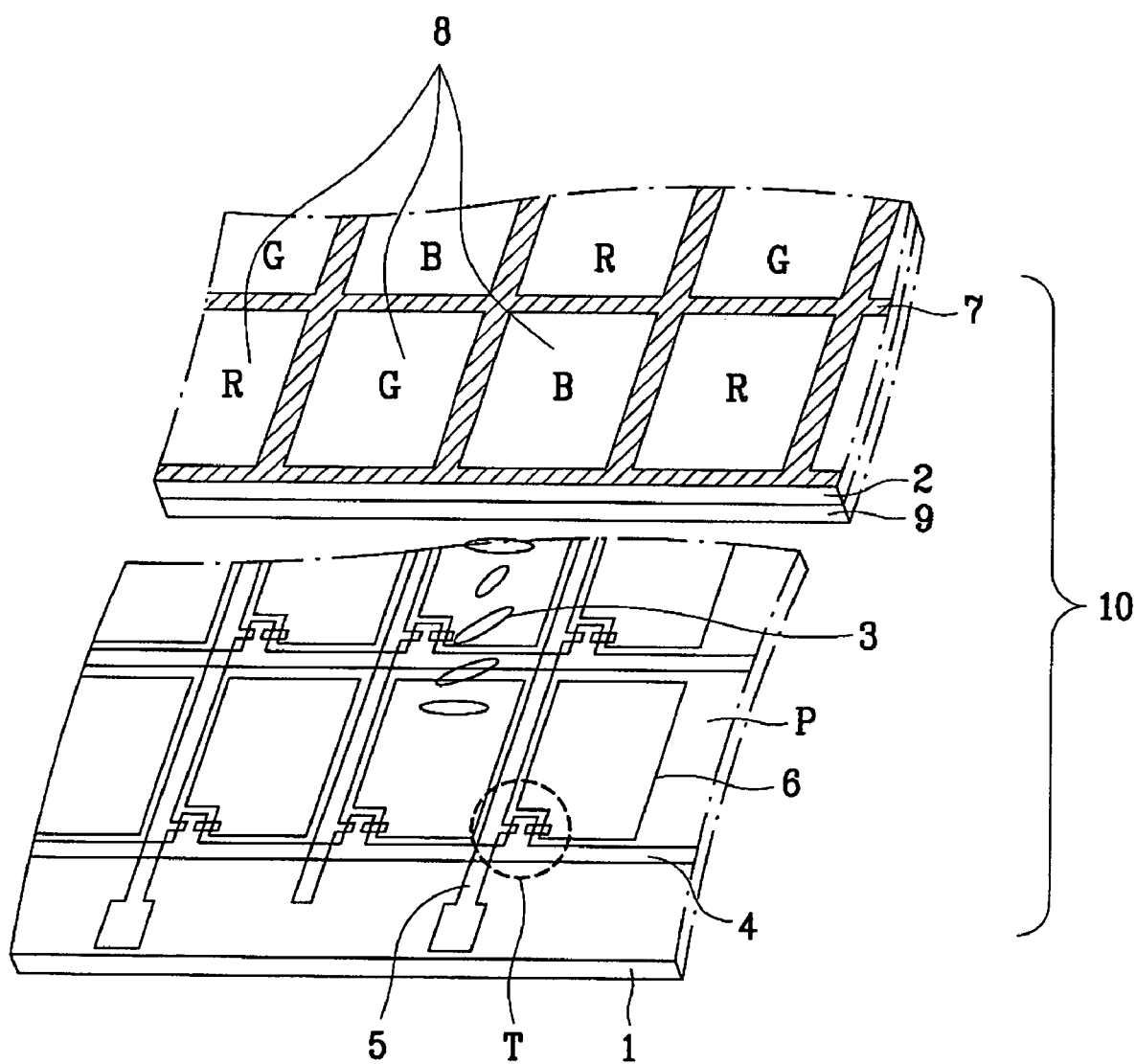
FIG. 1 is an exploded perspective view of an LCD device according to the related art.
Figure 2:
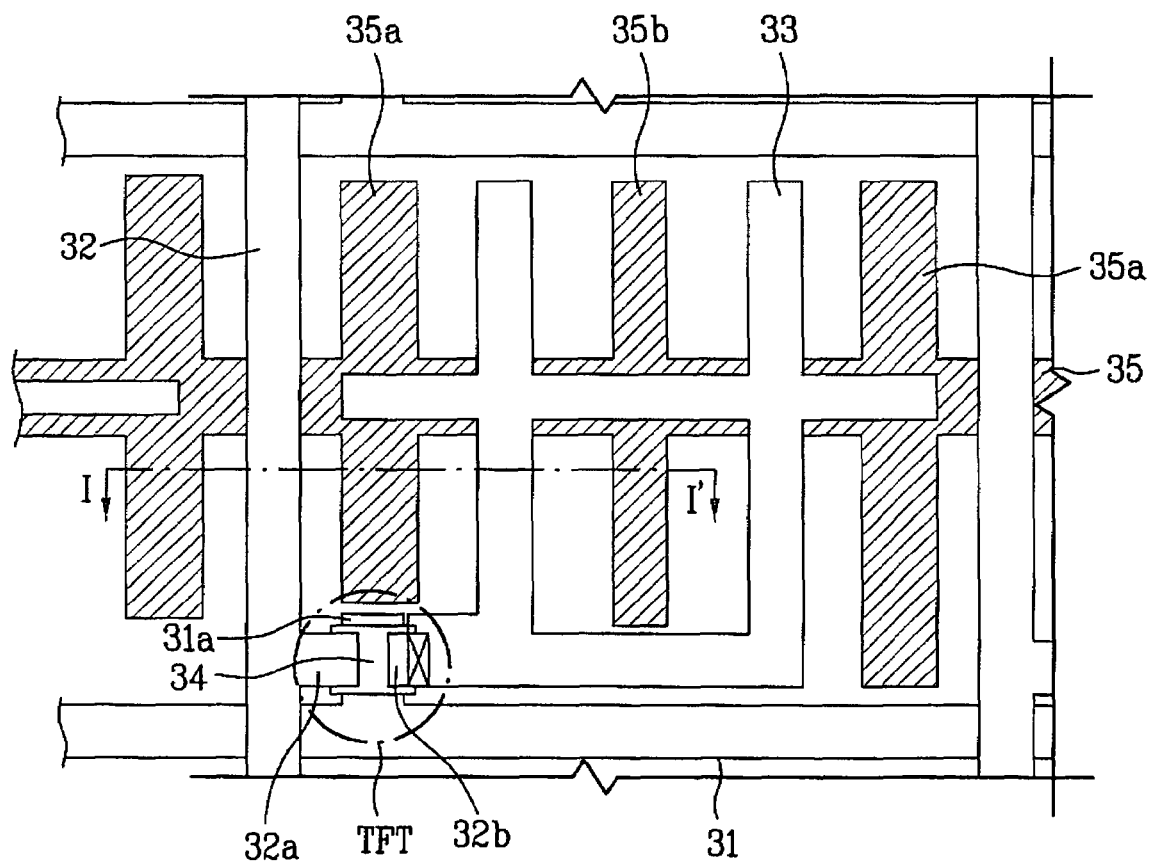
FIG. 2 is a plan view of an IPS mode LCD device according to the related art.
Figure 3:
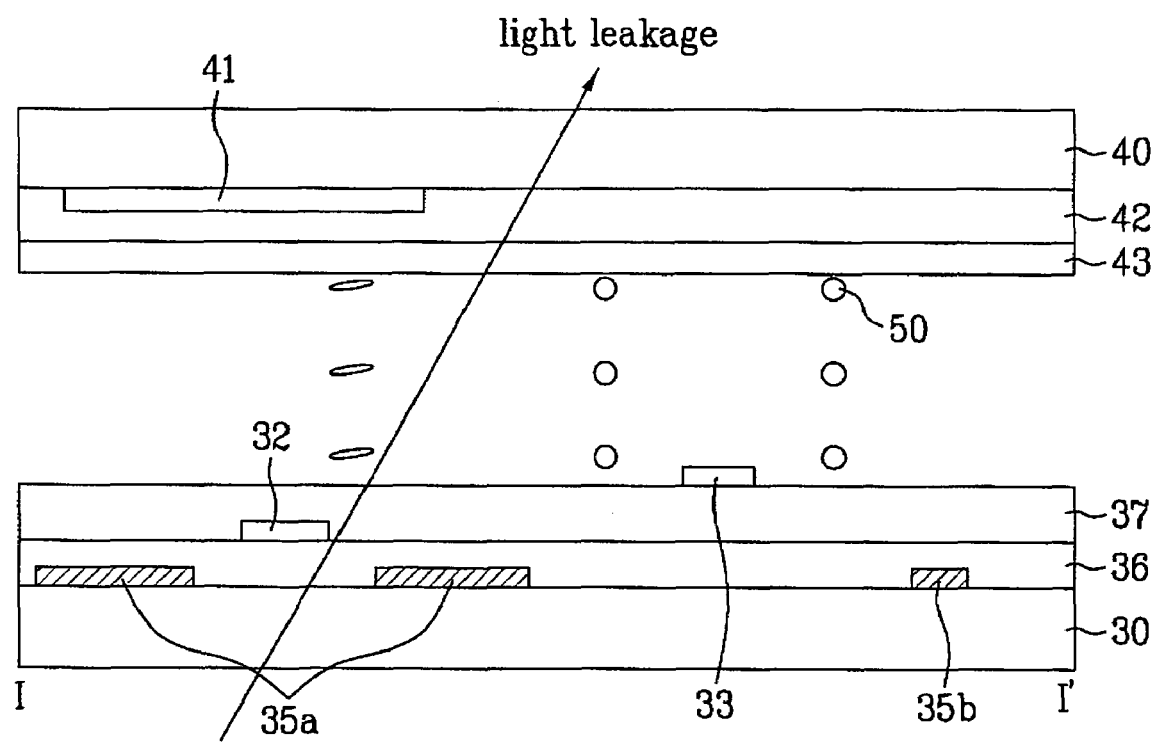
FIG. 3 is a cross sectional view of alignment of liquid crystal material along line I-I' of FIG. 2 according to the related art.
Figure 4:
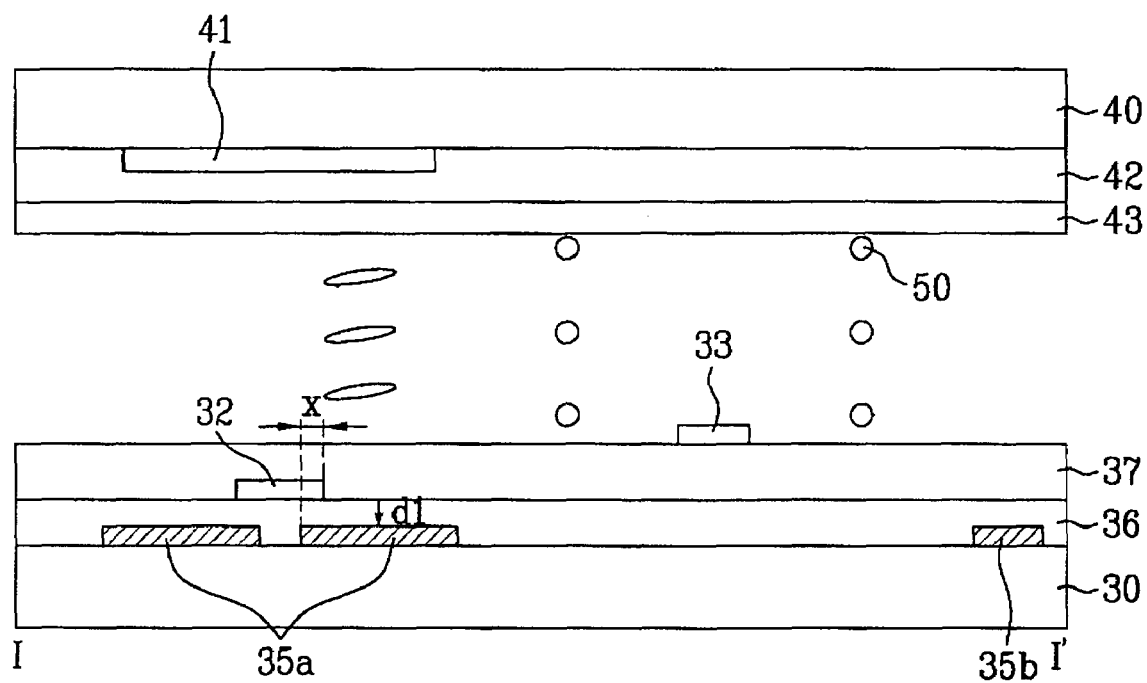
FIG. 4 is a cross sectional view of alignment of liquid crystal material along I-I' of FIG. 2 according to the related art.
Figure 5:
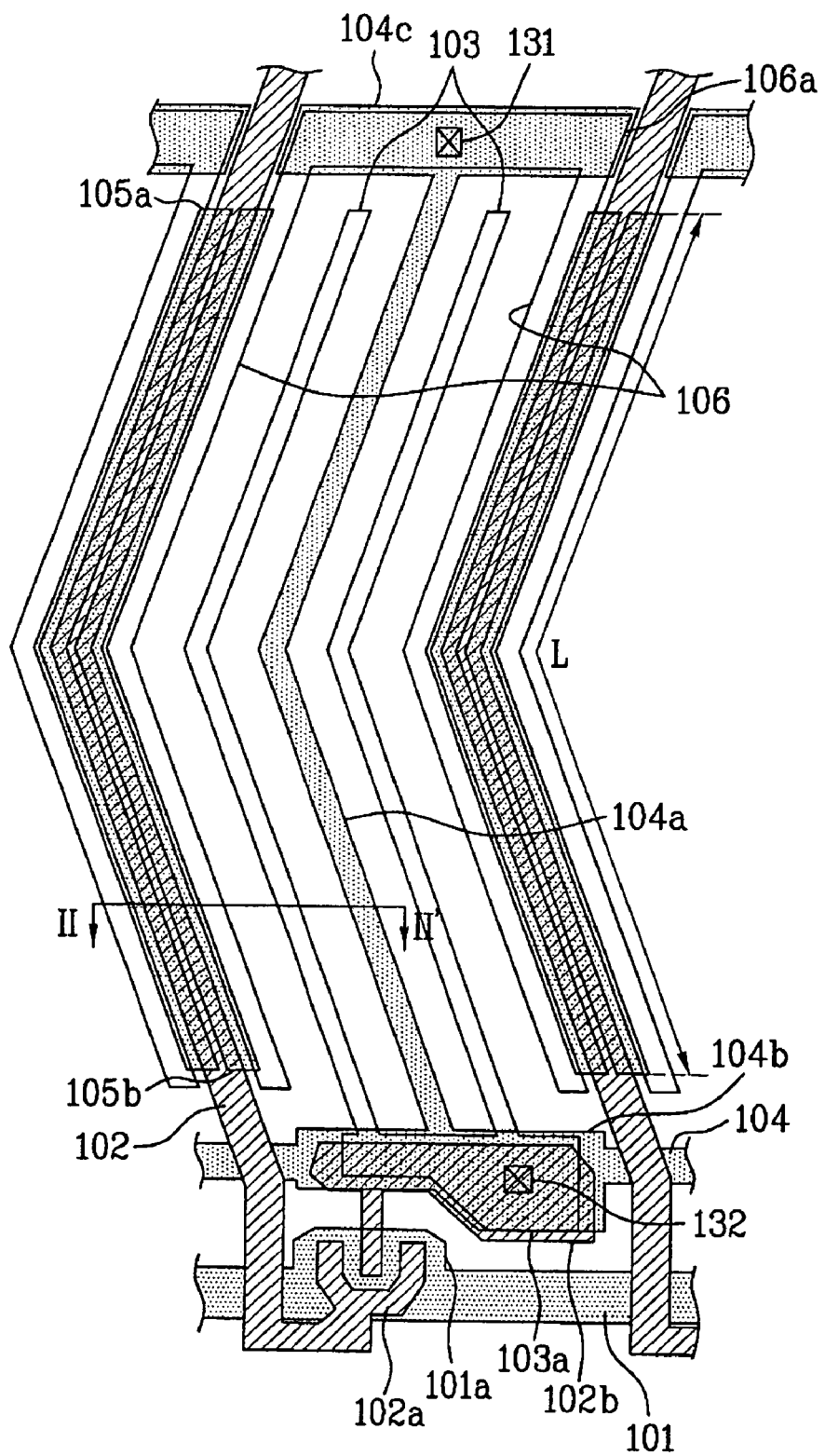
FIG. 5 is a plan view of an exemplary IPS mode LCD device according to the present invention.
Figure 6:
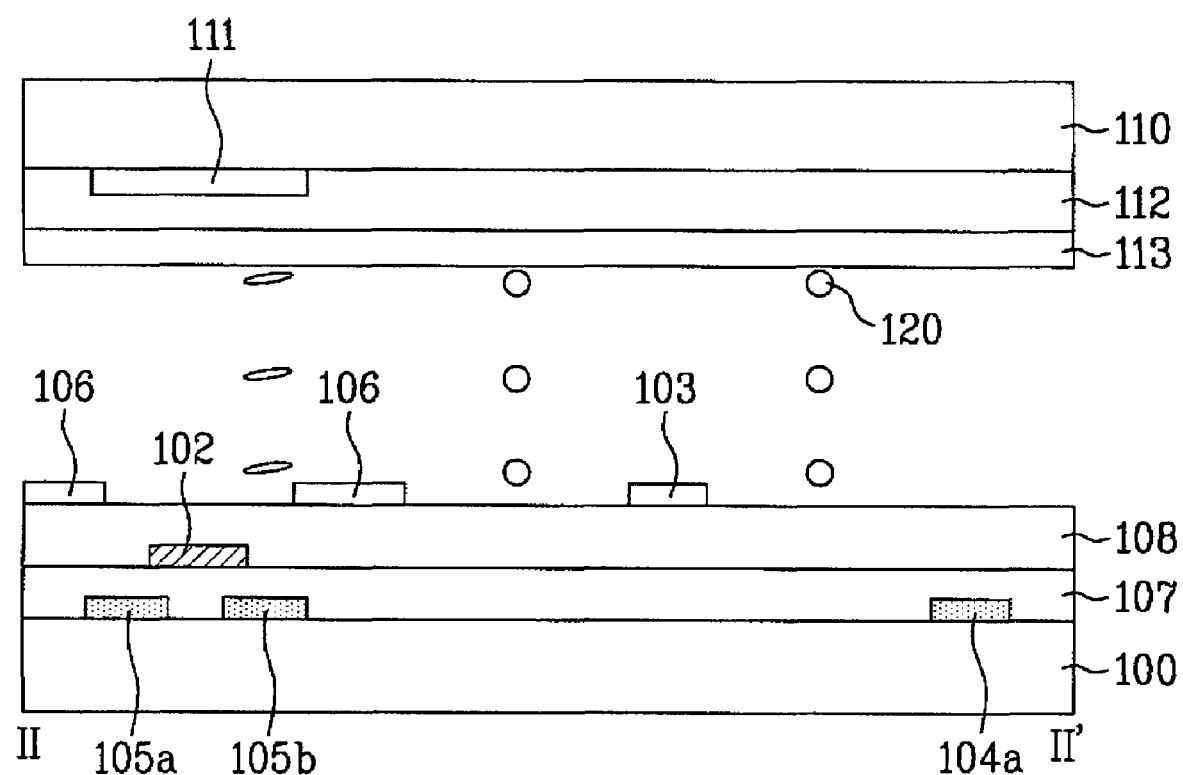
FIG. 6 is a cross sectional view along II-II' of FIG. 5 according to the present invention.

FIG. 5 is a plan view of an exemplary IPS mode LCD device according to the present invention and FIG. 6 is a cross sectional view along II-II' of FIG. 5 according to the present invention. As shown in FIGS. 5 and 6, the IPS mode LCD device includes first and second substrates 100 and 110 facing each other, and a liquid crystal layer 120 formed between the first and second substrates 100 and 110. The first substrate 100 includes a plurality of gate and data lines 101 and 102 crossing each other to define pixel regions, a plurality of thin film transistors TFT formed adjacent to crossings of the gate and data lines 101 and 102, first and second electrode patterns 105a and 105b, a common line 104, common electrodes 106 and 104a, and a pixel electrode 103. The first and second electrode patterns 105a and 105b are overlapped with both sides of the data line 102, wherein the first and second electrode patterns 105a and 105 are positioned at a predetermined interval therebetween. The common line 104 is formed across the pixel region in parallel to the gate line 101. Then, the common electrodes 106 and 104a are electrically connected with the common line 104 in the pixel region, wherein the outermost common electrodes 106 positioned in the outermost portions of the pixel region are partially overlapped with the first and second electrode patterns 105a and 105b. The pixel electrode 103 is electrically connected with a drain electrode of the thin film transistor TFT that alternates with the common electrodes 106 and 104a. In addition, the common line 104 is formed as one body with a second storage electrode 104b of a storage capacitor.

In FIG. 5, the thin film transistor TFT is comprised of a gate electrode 101a protruding from the gate line 101, a source electrode 102a protruding from the data line 102 and having a U-shape, and the drain electrode 102b formed inside the U-shape at a predetermined interval from the source electrode 102a. In this case, the drain electrode 102b is partially overlapped with the second storage electrode 104b.

The pixel electrode 103 is formed as one body with a first storage electrode 103a partially overlapping the drain electrode 102b. Accordingly, the first storage electrode 103a is electrically connected with the drain electrode 102b by a second contact hole 132. In addition, a gate insulating layer 107 is interposed between the second storage electrode and the first storage electrode 103a/drain electrode 102b, to thereby form the storage capacitor.

In FIG. 5, an outermost common electrode pattern 106a is formed as one body with the outermost common electrode 106. The common electrode 104a is electrically connected with the outermost common electrode pattern 106a by a first contact hole 131, whereby a common voltage is applied to the common electrode 104a and the outermost common electrode 106 through the common line 104.

The gate line 101, the common line 104 and the first and second electrode patterns 105a and 105b are formed of a light-shielding material at the same layer during the same process. The outermost common electrode 106 and the pixel electrode 103 are formed on the same layer, wherein the outermost common electrode 106 and the pixel electrode 103 are formed of a transparent material, such as indium-tin oxide (ITO). In addition, the gate insulating layer 107 is interposed between the data line 102 and the gate line 101, common line 104, the first electrode pattern 105a, and the second electrode pattern 105b. Then, a passivation layer 108 is formed between the data line 102 and the outermost common electrode 106 and pixel electrode 103.

In FIG. 5, the common electrode 104a is diverged from the common line 104 and extends toward an inside of the pixel region, and the common electrode 106 is formed in the outermost portion of the pixel region, thereby performing the function of the common electrodes. Referring to FIG. 5, in addition to the common electrode of the transparent material, the common electrode 104a of the light-shielding material is formed in the center of the pixel region to apply the common voltage to the outermost common electrode 106. In this case, the outermost common electrode 106 is diverged from the outermost common electrode pattern 106a, and the common electrode pattern 104c is positioned under the outermost common electrode pattern 106a. In addition, the first contact hole 131 is formed in the gate insulating layer 107 and the passivation layer 108 between the common electrode pattern 104c and the outermost common electrode pattern 106a, whereby the common electrode pattern 104c is electrically connected with the outermost common electrode pattern 106a. Therefore, the common voltage passing through the common line 104 is applied to the common electrode pattern 104c and the outermost common electrode pattern 106a.

In FIG. 5, the three common electrodes 106 and 104a are formed with a unit pixel region. However, the number of common electrodes may be varied. For example, if the number of common electrodes is changed, then the number of pixel electrodes which alternate with the common electrodes is similarly changed. In the case of an increasing number of common electrodes, the additional common electrodes may be formed of a transparent material as with the outermost common electrode 106, or may be formed of a light-shielding material that diverges from the common line 104.

According to the present invention, one side of the island-shaped common line 104 is partially overlapped with the data line, the first and second electrode patterns 105a and 105b are formed of the same material as the gate line 101 and are formed in the island-shape of the floating state in an unapplied electric field. In this case, the other side of each of the first and second electrode patterns 105a and 105b not overlapped with the data line 102 is partially overlapped with the common electrode 106. Accordingly, there is a first capacitance C1 by the data line 102 and the first or second electrode pattern 105a and 105b between the data line 102 and the common electrode 106, and a second capacitance C2 by the outermost common electrode 106 and the first or second electrode pattern 105a or 105b. The first and second capacitances C1 and C2 are connected in series.

Figure 7:
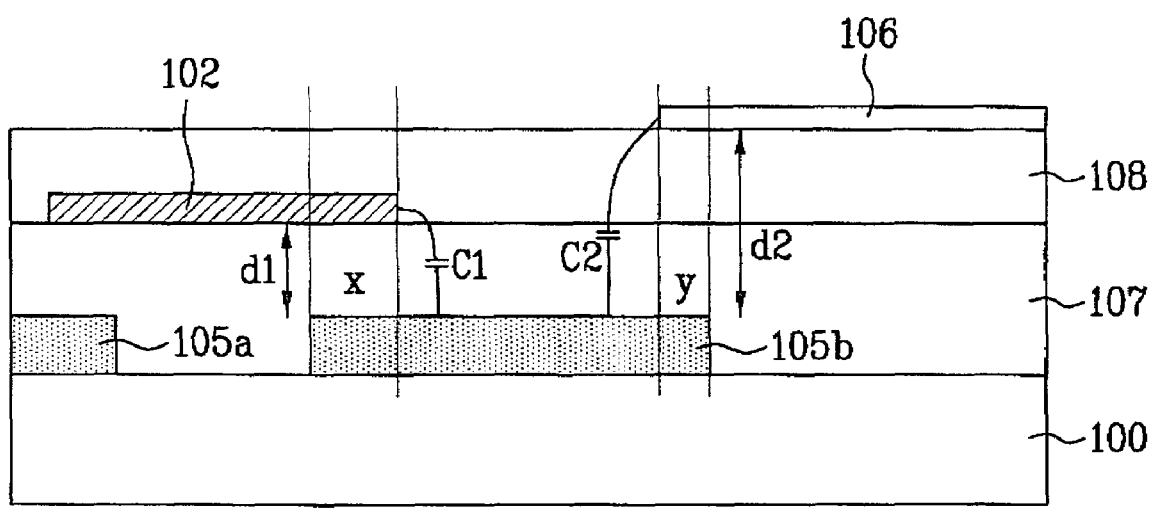
FIG. 7 is a cross sectional view of an exemplary first substrate having an overlapped area between an electrode pattern and a common electrode according to the present invention.

FIG. 7 is a cross sectional view of an exemplary first substrate having the overlapped area between the electrode pattern and the common electrode. As shown in FIG. 7, both sides of the data line 102 are overlapped with the first and second electrode patterns 105a and 105b by a width of "x". In addtion, both sides of the outermost common electrode 106 are overlapped with the first and second electrode patterns 105a and 105 by a width of "y". Accordingly, the first and second electrode patterns 105a and 105b, the data line 102, the outermost common electrode 106, and the common electrodes 104a are formed in parallel, as shown in FIG. 5, and the length of each of the first and second electrode patterns 105a and 105b corresponds to a length "L".

Supposing that the first and second capacitances C1 and C2 are connected in series, a distance between a lower surface of the data line 102 and an upper surface of the first or second electrode pattern 105a or 105b corresponds to a distance "d1", and a distance between a lower surface of the outermost common electrode 106 and an upper surface of the first or second electrode pattern 105a or 105b corresponds to distance "d2". In this case, the total capacitance C between the data line 102 and the outermost common electrode 106 corresponds to $$C = \frac{C1 * C2}{C1 + C2}, \text{ wherein } C1 = \frac{\varepsilon xL}{d1}, \text{ and } C2 = \frac{\varepsilon yL}{d2}.$$

As a result, the total capacitance C corresponds to $$C = \varepsilon L \frac{xy}{yd1 + xd2}.$$

If the overlapped areas have the same width (i.e., x=y), the total capacitance corresponds to $$C = \varepsilon L \frac{x}{d1 + d2}.$$

If d2 corresponds to 1.5d1, the total capacitance is $$C = \frac{2\varepsilon L}{5d1}.$$

That is, the total capacitance of the present invention is decreased about 40% as compared with that of the related art structure of overlapping the outermost common electrode with the data line. Accordingly, the gate insulating layer 107 and the passivation layer 108 are formed between the outermost common electrode 106 and the first and second electrode patterns 105a and 105b, whereby "d2" is larger than "d1" (i.e., the interval between the data line and the first and second electrode patterns 105a and 105b in the gate insulating layer). According to the present invention, the total capacitance C between the data line 102 and the outermost common electrode 106 is decreased by about 50% or less. Then, the passivation layer 108 is formed of an organic insulating layer having a thickness of 1~3 μm instead of an inorganic insulating layer having a thickness of 2000 Å~4000 Å, thereby minimizing the total capacitance C. In addition, the gate insulating layer 107 is formed of an inorganic insulating layer.

Figure 8A:
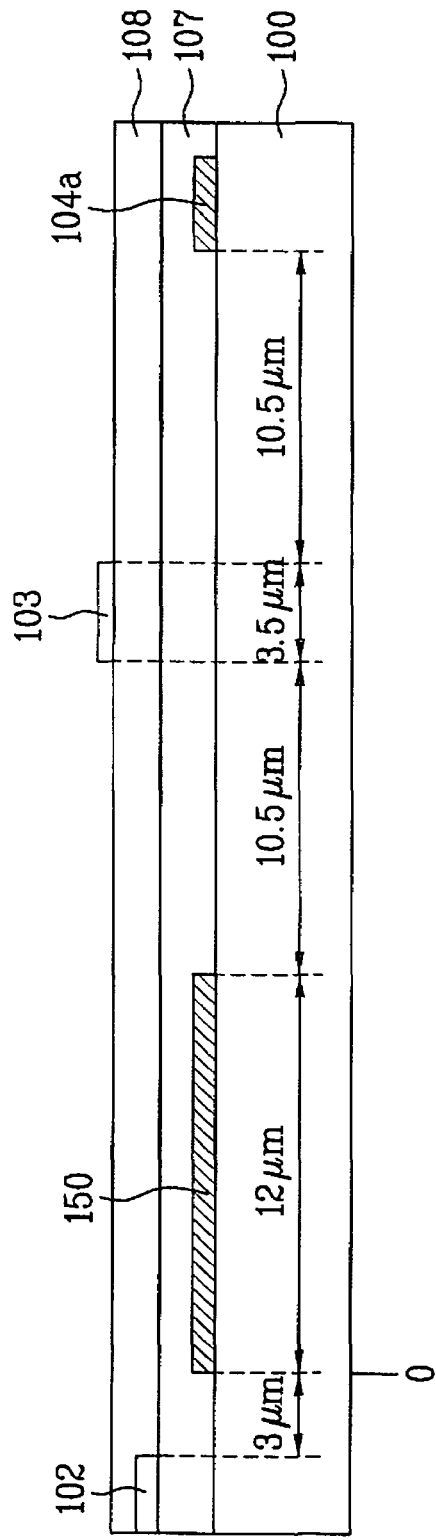
FIG. 8A is a cross sectional view of another exemplary substrate in which an outermost common electrode is formed at a predetermined interval from a data line according to the present invention.
Figure 8B:
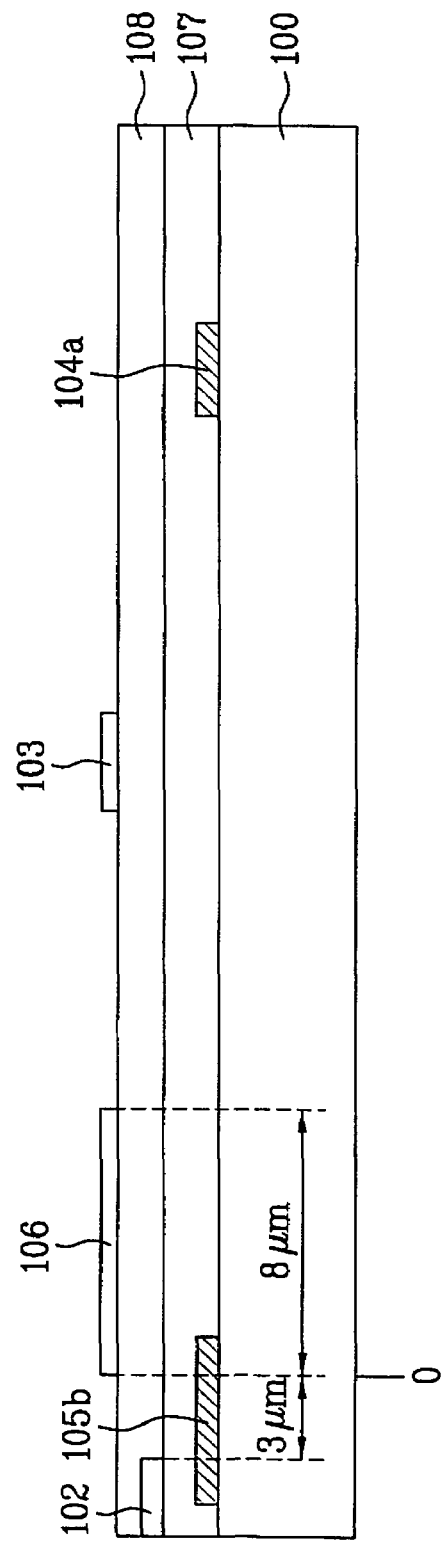
FIG. 8B is a cross sectional view of another exemplary substrate in which a second electrode pattern partially overlaps a data line and an outermost common electrode partially overlaps with the second electrode pattern according to the present invention.
Figure 9:
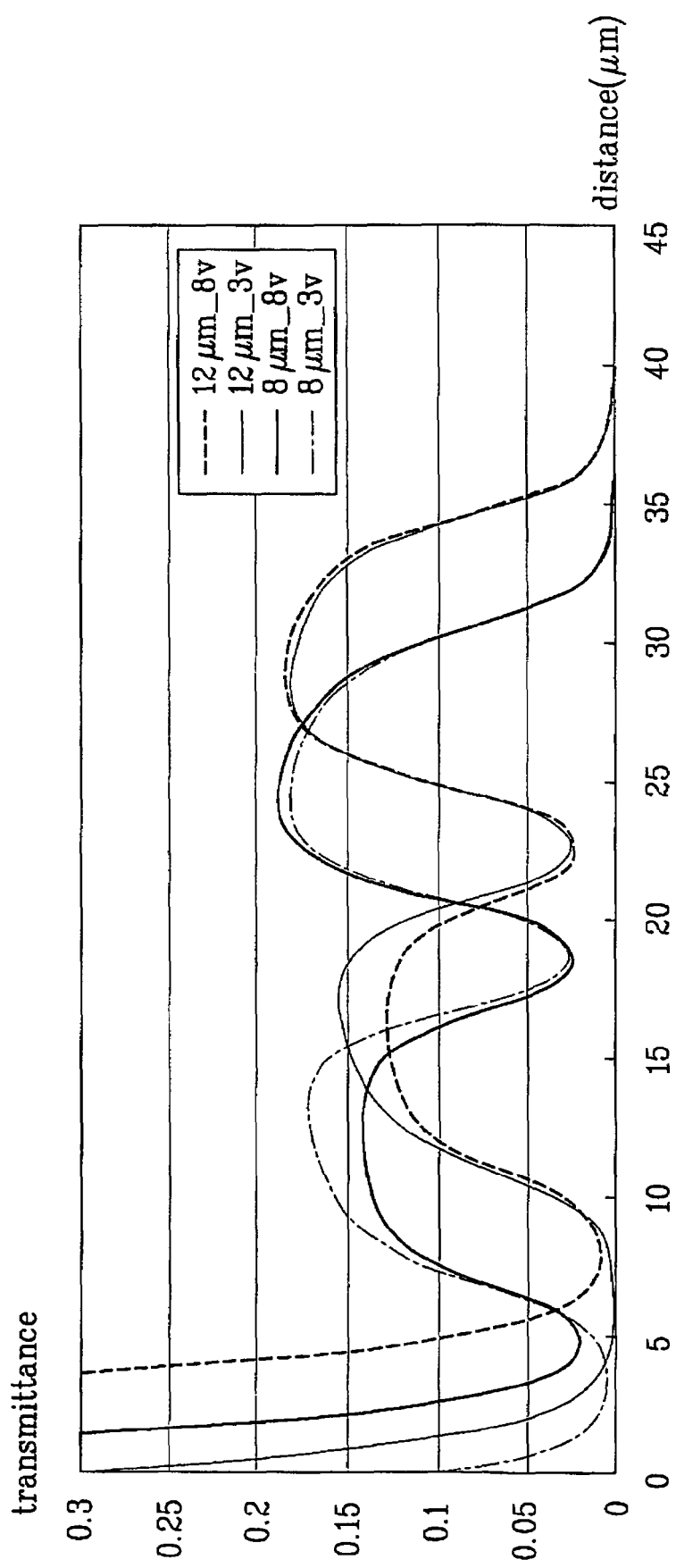
FIG. 9 is a graph illustrating a transmittance in a black state when signals are applied to a data line in FIGS. 8A and 8B according to the present invention.

FIG. 8A is a cross sectional view of another exemplary substrate in which an outermost common electrode is formed at a predetermined interval from a data line according to the present invention, FIG. 8B is a cross sectional view of another exemplary substrate in which a second electrode pattern partially overlaps a data line and an outermost common electrode partially overlaps with the second electrode pattern according to the present invention, and FIG. 9 is a graph illustrating a transmittance in a black state when signals are applied to a data line in FIGS. 8A and 8B according to the present invention.

Referring to FIG. 8A, when not providing the floating electrode, if a point about 3 micrometers apart from the right end of the data line 102 toward the outermost common electrode 150 is referred to as "0", then the left end of the outermost common electrode 150 having the width of about 12 micrometers is positioned at the point of "0", and the pixel electrode 103 and the common electrode 104a are positioned at the fixed intervals in the pixel region. In this case, the common voltage is applied to the outermost common electrode 150 from the common line (not shown).

As shown in FIG. 8B, the second electrode pattern 105b is formed in the floating state to be overlapped with the right side of the data line 102 (although not shown, the first electrode pattern 105a is overlapped with the left side of the data line 102), and the outermost common electrode 106 is overlapped with the second electrode pattern 105b. In this case, the left end of the outermost common electrode 106 is positioned at the point of "0". However, since the width of the outermost common electrode 106 is decreased to about 8 μm (micrometers), the pixel electrode 103 and the common electrodes 104a are shifted to the left side by 4 μm (micrometers), as compared with FIG. 8A. Except when the transmittance curve is shifted to the left side, FIGS. 8A and 8B have similar transmittances in the black state.

According to the present invention, as shown in FIG. 8B, even though the width of the outermost common electrode 106 is decreased, the transmittance in the black state of FIG. 8B is similar to that of FIG. 8A of positioning the outermost common electrode 150 having the width of about 12 μm to which the common voltage is applied. In addition, the transmittance in the periphery of the data line 102 is changed according to the data voltage applied to the data line 102. Therefore, the transmittance of the periphery of the data line is largely changed when applying a high voltage of about 8V. However, when approaching the center of the pixel region, constant transmittance is maintained without regard to the applied data voltage.

According to the present invention, the IPS mode LCD device is able to maintain high transmittance, while decreasing the width of the outermost common electrode by about 4 μm, thereby improving the aperture ratio. In addition, the second electrode pattern 105b of the floating state is overlapped with the predetermined portion of the data line 102, thereby decreasing the parasitic capacitance between the data line 102 and the outermost common electrode 106. In this case, the outermost common electrode 106 is limited in its decrease of width. Because a vertical crosstalk may be generated in liquid crystal of the pixel region due to the electric field of the data line, the case of forming the outermost common electrode having a width of about 12 μm of FIG. 8A will be shown in Table 1.

TABLE 1

| width of outermost common electrode | application of common voltage to outermost common electrode | floating, 6 μm | floating, 8 μm | floating, 10 μm | floating, 12 μm |
|---|---|---|---|---|---|
| vertical crosstalk | 6.3% | 9.6% | 6.1% | 4.1% | 2.8% |

In Table 1, the vertical crosstalk is a simulated value. When the floating electrode has a width of about 8 μm or more, the simulated values (6.1%, 4.1%, 2.8%) of the vertical crosstalk are smaller than the related art (6.3% —the outermost common electrode having a width of about 12 μm with application of the common voltage to the outermost common electrode). As a result, when using a floating electrode having a width about 8 μm or more, it is possible to maintain low vertical crosstalk and improve the aperture ratio.

Figure 10:
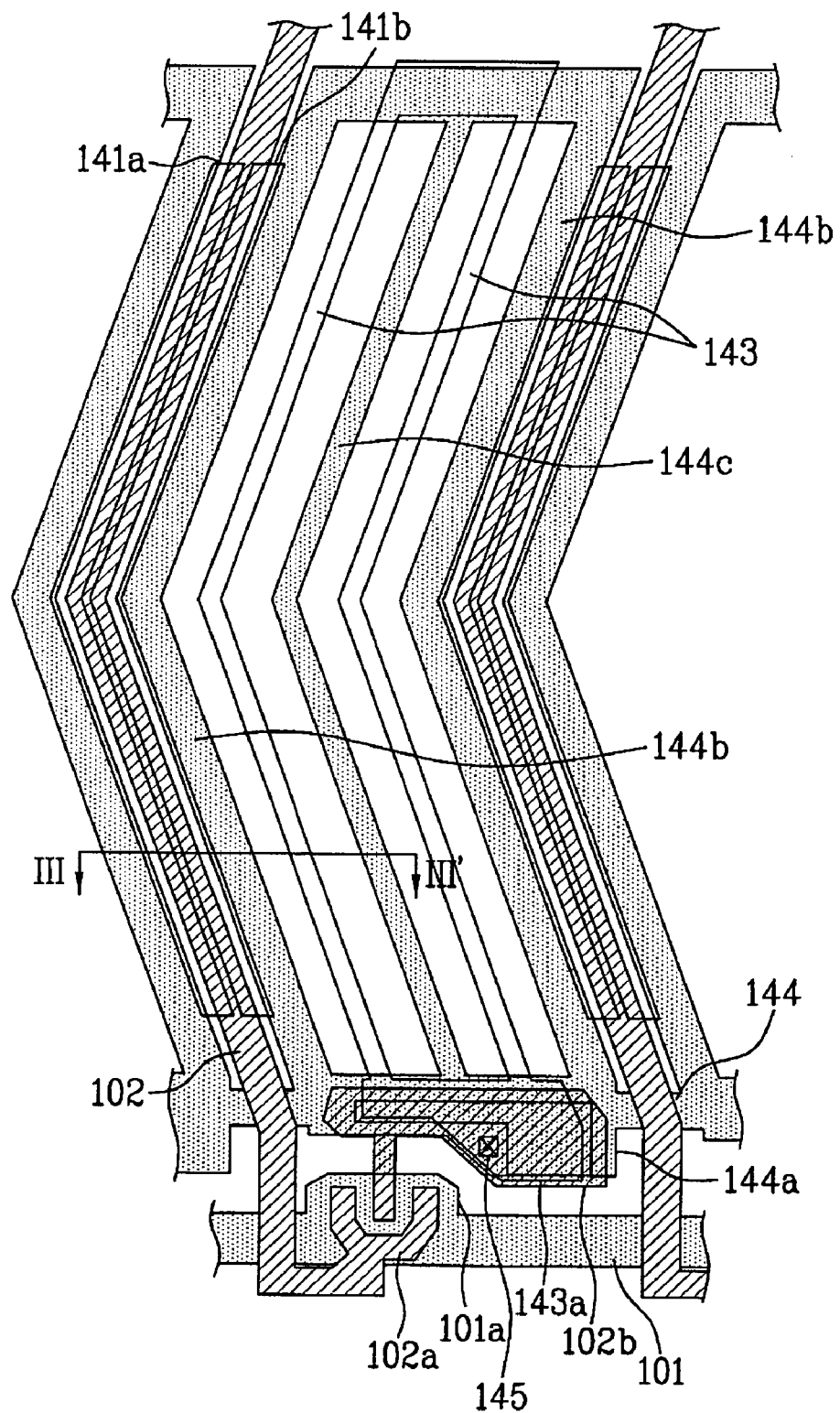
FIG. 10 is a plan view of an exemplary IPS mode LCD device according to the present invention.
Figure 11:
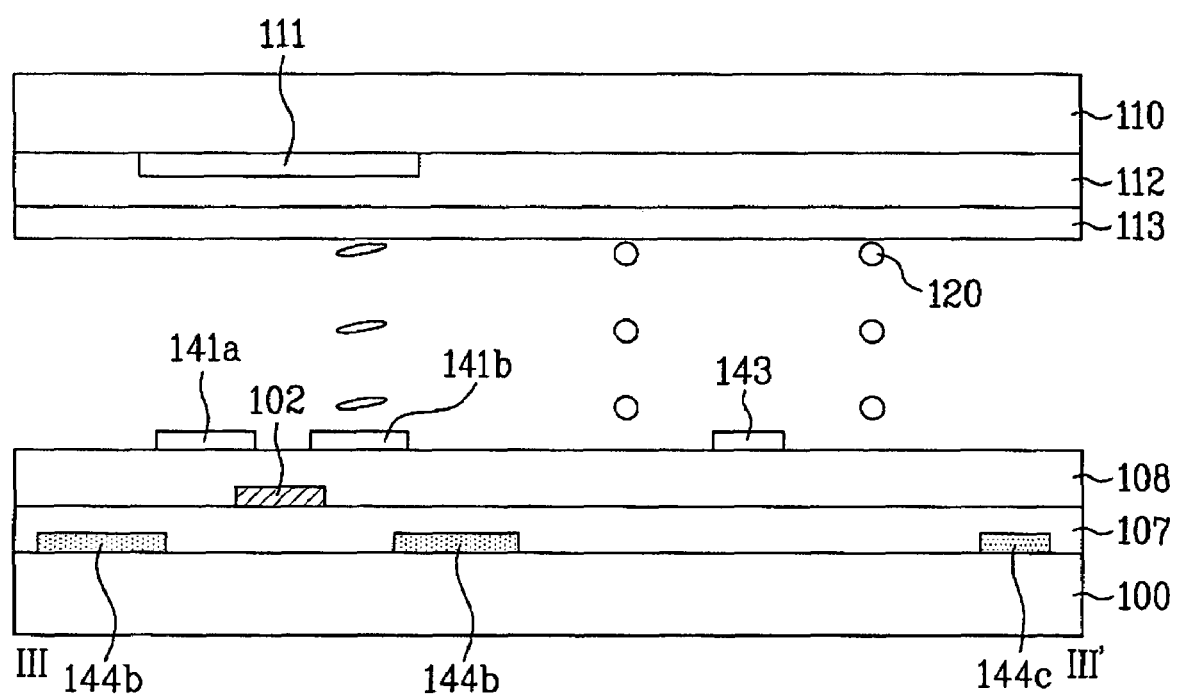
FIG. 11 is a cross sectional view along III-III' of FIG. 10 according to the present invention.

FIG. 10 is a plan view of an exemplary IPS mode LCD device according to the present invention, and FIG. 11 is a cross sectional view along III-III' of FIG. 10 according to the present invention. Except for first and second electrode patterns 141a and 141b formed in the same layer as a pixel electrode 143, and common electrodes including an outermost common electrode 144b formed of the same material as a gate line 101 and common line 144, the exemplary IPS mode LCD device of FIG. 10 in the present invention is similar in structure to that of FIG. 5 and utilizes the same reference numbers.

In FIG. 10, the first and second electrode patterns 141a and 141b are formed in the floating state and at a predetermined interval with the pixel electrode 143, thereby decreasing a parasitic capacitance between an outermost common electrode and a data line. Without increasing a width of a black matrix layer, it is possible to decrease the data line and the adjacent outermost common electrode, thereby improving the aperture ratio.

In FIG. 10, the first substrate 100 includes a plurality of gate and data lines 101 and 102 crossing each other to define pixel regions, and a plurality of thin film transistors TFT formed adjacent to crossings of the gate and data lines 101 and 102. Each thin film transistor includes a gate electrode 101a protruding from the gate line 101, a source electrode 102a protruding from the data line 102 and having a U-shape, and a drain electrode 102b formed inside the U-shape at a predetermined interval from the source electrode 102a, the first and second electrode patterns 141a and 141b, the common line 144, the common electrodes 144b and 144c, and the pixel electrode 143. The first and second electrode patterns 141a and 141b are overlapped with both sides of the data line 102, wherein the first and second electrode patterns 105a and 105 are positioned at a predetermined interval therebetween. In addition, the common line 104 is formed across the pixel region in parallel to the gate line 101. Then, the common electrodes 144a and 144b are electrically connected with the common line 144 in the pixel region. Accordingly, the common electrodes are positioned in the outermost portions of the pixel region and are partially overlapped with the first and second electrode patterns 141a and 141b. Furthermore, the pixel electrode 143 electrically connected with the drain electrode 102b of the thin film transistor TFT alternates with the common electrodes 144a and 144b.

In FIG. 10, the gate line 101, the common line 144, and the common electrodes 144b and 144c are formed of a light-shielding material in the same layer. In FIG. 11, the first and second electrode patterns 141a and 141b and the pixel electrode 143 are formed of a transparent material in the same layer. The pixel electrode 143 is formed as one body with a first storage electrode 143a partially overlapped with the drain electrode 102b. In this case, the first storage electrode 143a is electrically connected with the drain electrode 102b by a contact hole 145. In addition, a gate insulating layer 107 is interposed between the second storage electrode 144a and the first storage electrode 143a and drain electrode 102b to form a storage capacitor.

In FIG. 11, the gate insulating layer 107 is interposed between the data line 102 and the gate line 101, common line 144, and common electrodes 144b and 144c. A passivation layer 108 is formed between the data line 102 and the first electrode pattern 141a, second electrode pattern 141b, and pixel electrode 143. Accordingly, the gate insulating layer 107 is formed of an inorganic insulating layer, and the passivation layer 108 may be formed of an organic insulating layer or an inorganic insulating layer. If the passivation layer 108 is formed of the organic insulating layer, it is possible to minimize the capacitance between the pixel electrode 143 and the outermost common electrode 144b, thereby improving the display efficiency.

According to the present invention, an IPS mode LCD device may include first and second electrode patterns overlapped with both sides of the data line, wherein the first and second electrode patterns are formed in a floating state. In addition, the other end of each of the first and second electrode patterns is partially overlapped with the outermost common electrode, thereby improving driving efficiency by decreasing the parasitic capacitance between the data line and the outermost common electrode. That is, it is possible to prevent an increase in charging time, as well as prevent the luminance from deteriorating.

According to the present invention, first and second electrode patterns may be formed in the same layer as the pixel electrode of the transparent electrode material, or may be formed in the same layer as the gate line of the light-shielding material. If the first and second electrode patterns are formed in the same layer as the pixel electrode of the transparent electrode material, the outermost common electrode is formed in the same layer as the gate line. Meanwhile, if the first and second electrode patterns are formed in the same layer as the gate line of the light-shielding material, the outermost common electrode is formed in the same layer as the electrodes of the transparent electrode material. In addition, when providing the first and second electrode patterns in a floating state, it is possible to decrease the width of the outermost common electrode, thereby improving the aperture ratio.

It will be apparent to those skilled in the art that various modifications and variations can be made in the IPS LCD device in the present invention without departing from the spirit or scope of the inventions. Thus, it is intended that the present invention covers the modifications and variations of this invention provided they come within the scope of the appended claims and their equivalents.

What is claimed is:

1. An IPS (In-Plane Switching) mode LCD device, comprising:
    first and second substrates facing each other;
    gate and data lines on the first substrate and crossing each other to define a plurality of unit pixel regions;
    first and second electrode patterns formed in an island shape at a predetermined interval therebetween and overlapped with sides of the data line;
    a plurality of common electrodes formed in the unit pixel regions, each of the common electrodes having outermost common electrodes partially overlapped with the first and second electrode patterns, wherein the outermost common electrodes are not overlapped with the date line at both sides of the data line;
    a pixel electrode alternately provided with the common electrodes within the pixel unit region; and
    a liquid crystal layer formed between the first and second substrates.

2. The device according to claim 1, wherein the first and second electrode patterns are formed in the same layer as the gate line.

3. The device according to claim 1, wherein the first and second electrode patterns are formed in the same layer as the pixel electrode.

4. The device according to claim 1, wherein the common electrodes and the pixel electrode include a transparent material.

5. The device according to claim 1, further comprising a common line extending across the unit pixel region parallel to the gate line.

6. The device according to claim 5, wherein the common line is electrically connected with the common electrode.

7. The device according to claim 5, wherein the common line is formed in the same layer as the gate line.

8. The device according to claim 1, further comprising a thin film transistor formed adjacent to the crossing of the gate and data lines, wherein a thin film transistor includes a gate electrode protruding from the gate line, a source electrode protruding from the data line, and a drain electrode formed at a predetermined interval from the source electrode.

9. The device according to claim 8, wherein the drain electrode is electrically connected with the pixel electrode.

10. The device according to claim 1, further comprising a gate insulating layer between the gate line and the data line.

11. The device according to claim 1, further comprising a passivation layer between the data line and the pixel electrode.

12. The device according to claim 11, wherein the passivation layer includes an organic insulating material.

13. An IPS (In-Plane Switching) mode LCD device comprising:
    first and second substrates facing each other;
    gate and data lines on the first substrate and crossing each other to define a plurality of unit pixel regions;
    a thin film transistor (TFT) formed adjacent to the crossing of the gate and data lines, the TFT includes a gate electrode protruding from the gate line, a source electrode protruding from the data line, and a drain electrode formed at a predetermined interval from the source electrode;
    first and second electrode patterns formed in an island shape at a predetermined interval therebetween and overlapped with sides of the data line;
    a common line formed extending across the pixel region parallel to the gate line;
    a plurality of common electrodes electrically connected with the common line in the unit pixel region, each of the common electrodes having outermost common electrodes partially overlapped with the first and second electrode patterns, wherein the outermost common electrodes are not overlapped with the data line at both sides of the data line;
    a pixel electrode alternately provided with the common electrodes within the unit pixel region and electrically connected with the drain electrode of the pixel region;
    a gate insulating layer formed between the data line, the gate line, the common line, first electrode pattern and the second electrode pattern;
    a passivation layer formed between the data line, the common electrode and the pixel electrode; and
    a liquid crystal layer formed between the first and second substrates.

14. The device according to claim 13, wherein the passivation layer includes an organic insulating material.

15. The device according to claim 13, wherein the gate line, the common line, the first electrode pattern and the second electrode pattern are formed in the same layer.

16. The device according to claim 13, wherein the pixel electrode and the common electrodes are formed in the same layer.

17. The device according to claim 16, wherein the pixel electrode and the common electrode include a transparent material.

18. An IPS (In-Plane Switching) mode LCD device, comprising:
    first and second substrates facing each other;
    gate and data lines on the first substrate and crossing each other to define a plurality of unit pixel regions;
    a thin film transistor (TFT) formed adjacent to the crossing of the gate and data lines, the TFT including a gate electrode protruding from the gate line, a source electrode protruding from the data line, and a drain electrode formed at a predetermined interval from the source electrode;
    first and second electrode patterns formed in an island shape at a predetermined interval therebetween and overlapped with sides of the data line;
    a common line formed extending across the pixel region parallel to the gate line;
    a plurality of common electrodes electrically connected with the common line in the pixel region, each of the common electrodes having outermost common electrodes partially overlapped with the first and second electrode patterns, wherein the outermost common electrodes are not overlapped with the date line at both sides of the data line;

a pixel electrode alternately provided with the common electrodes in the pixel region and electrically connected with the drain electrode of the pixel region;

a gate insulating layer formed between the data line and the gate line, the common line and the common electrode;

a passivation layer formed between the data line and the first electrode pattern, the second electrode pattern, and the pixel electrode; and a liquid crystal layer formed between the first and second substrates.

19. The device according to claim 18, wherein the gate line, the common line, and the common electrode are formed in the same layer.

20. The device according to claim 18, wherein the first and second electrode patterns are formed in the same layer as the pixel electrode.

21. The device according to claim 20, wherein the first and second electrode patterns and the pixel electrode include a transparent material.

22. The device according to claim 18, wherein the passivation layer includes an organic insulating material.

* * * * *